Dec. 9, 1930. W. H. BURDEN ET AL 1,783,997
APPARATUS FOR THE MANUFACTURE OF PENCILS
Filed Nov. 13, 1928   9 Sheets-Sheet 8
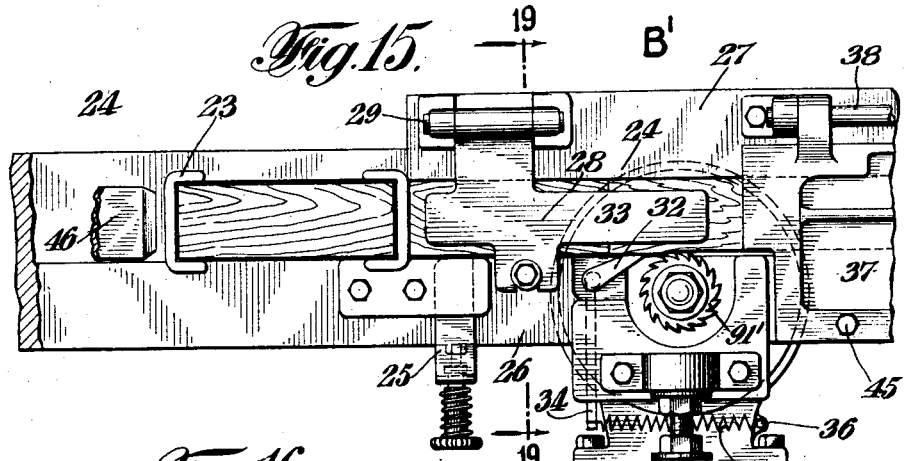
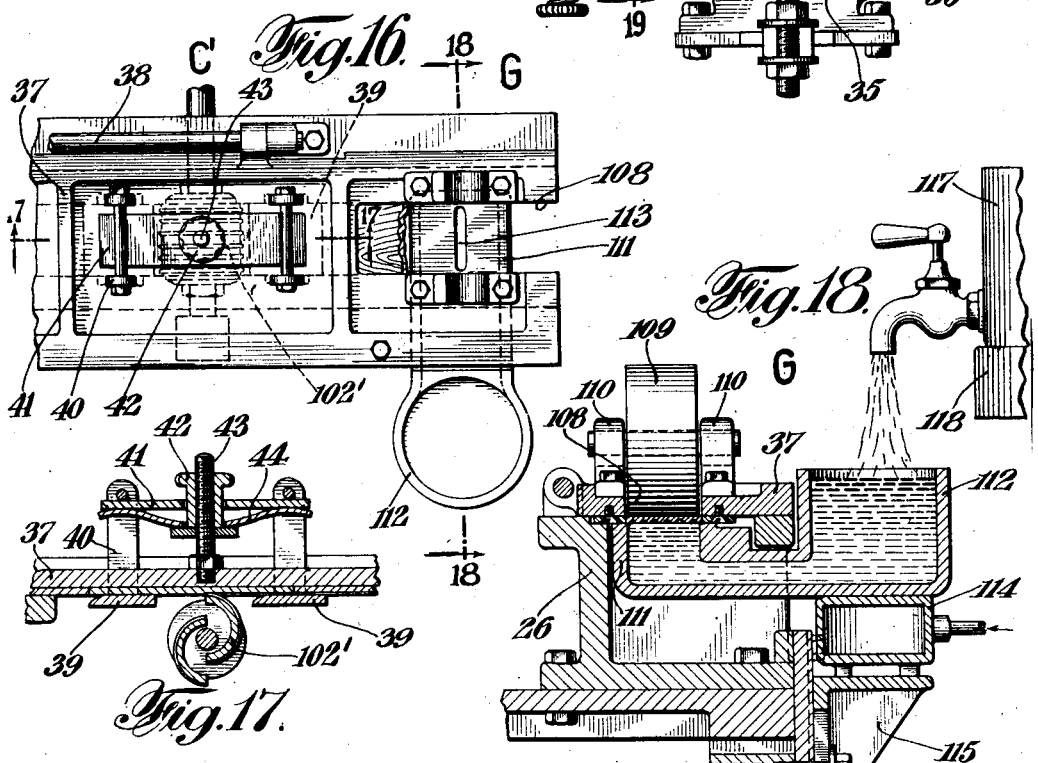
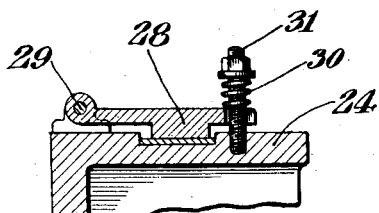

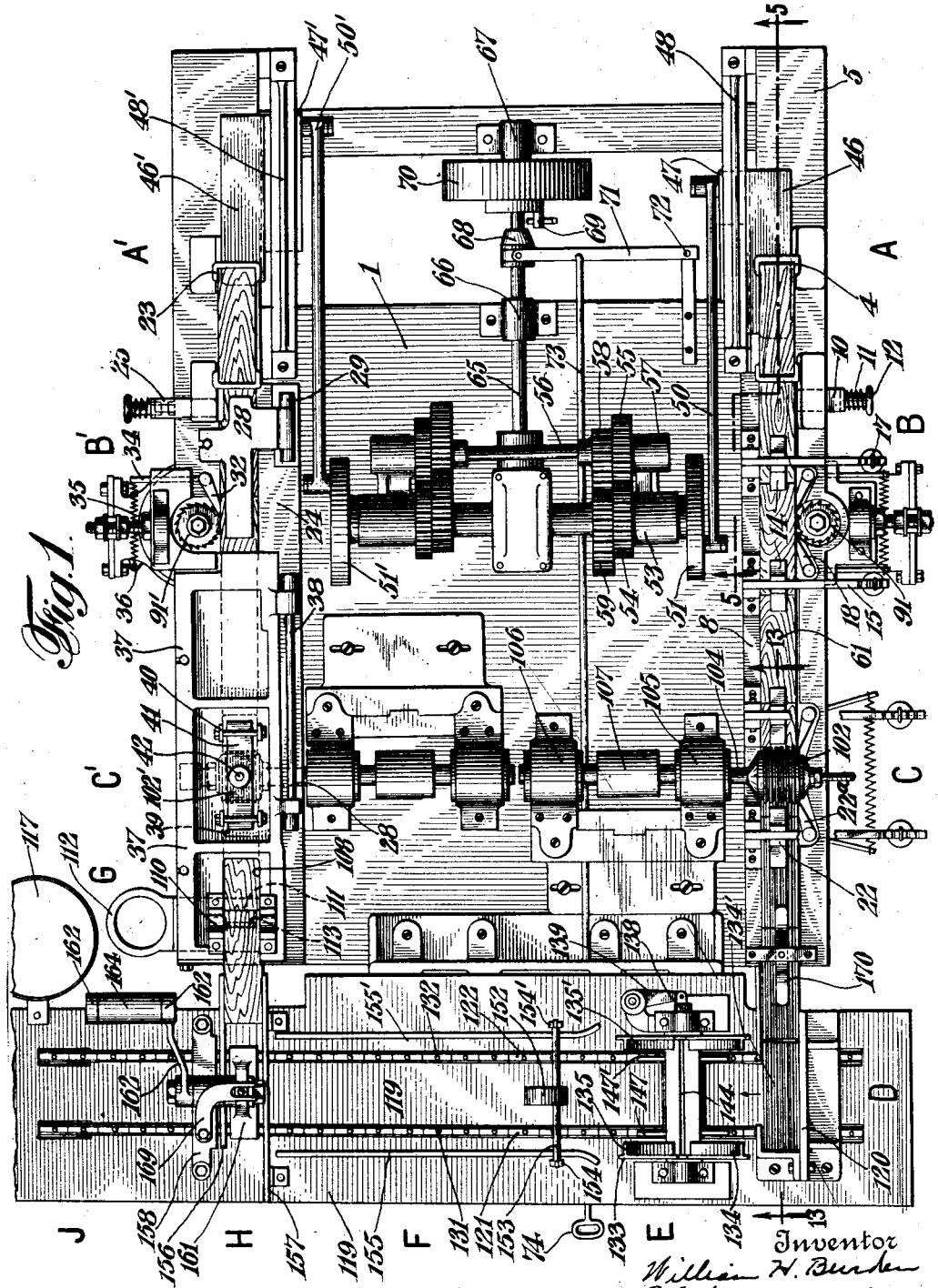

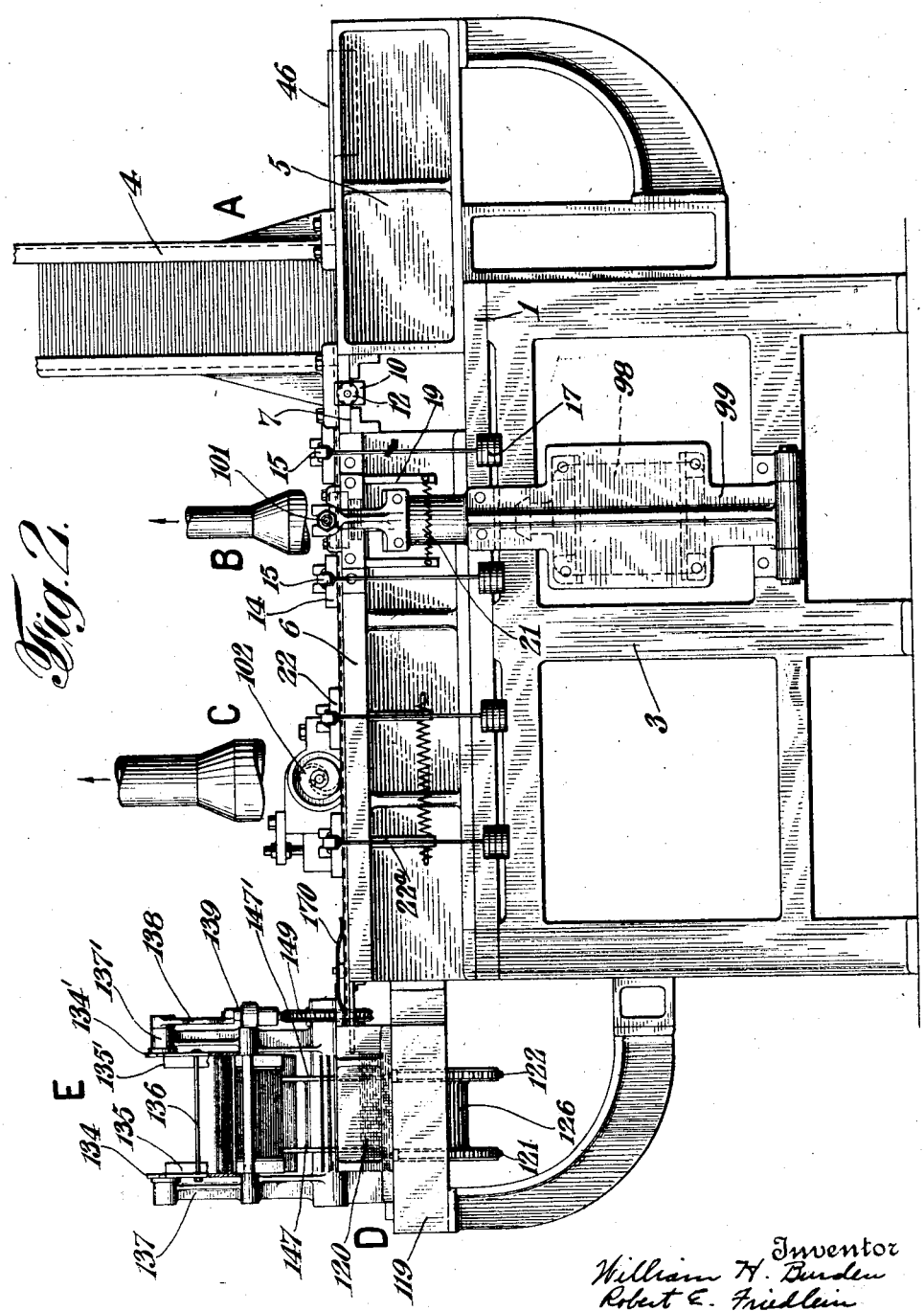

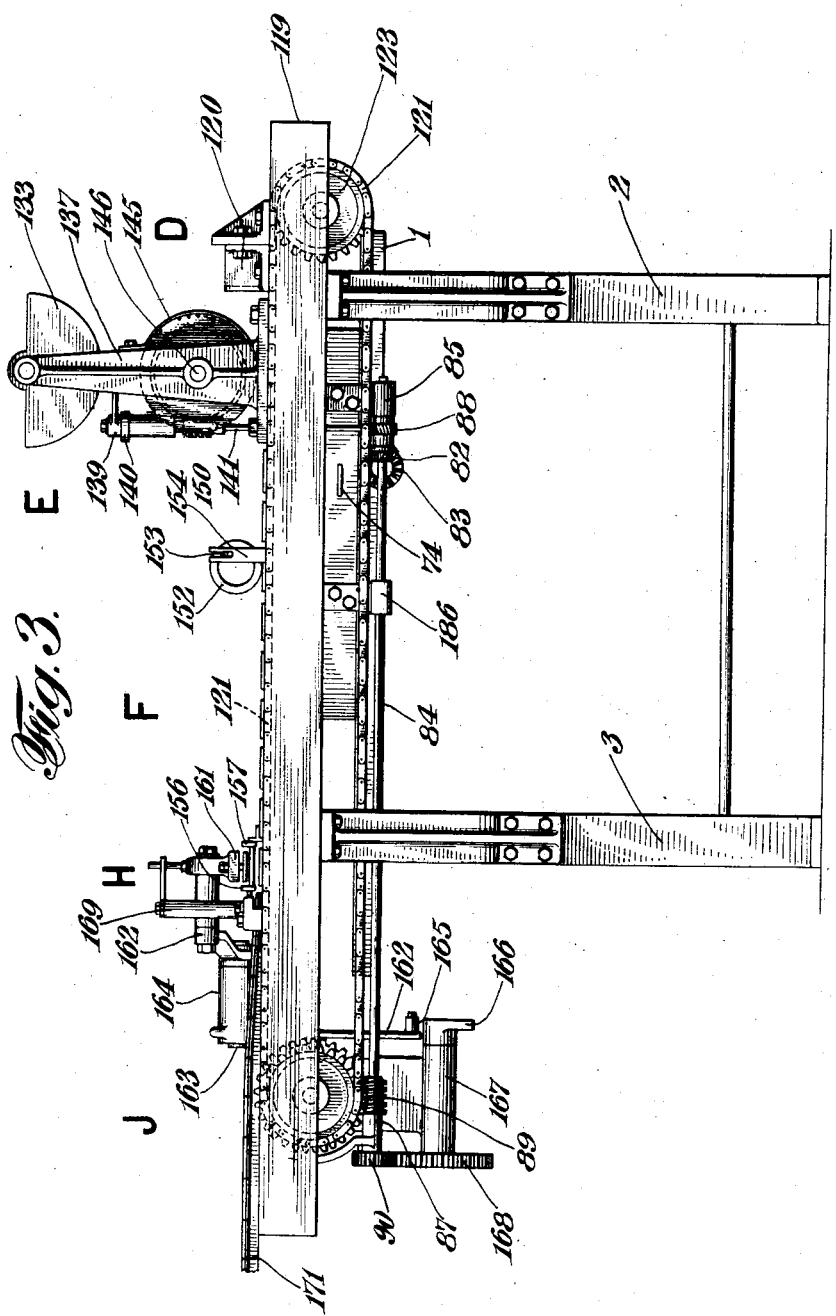

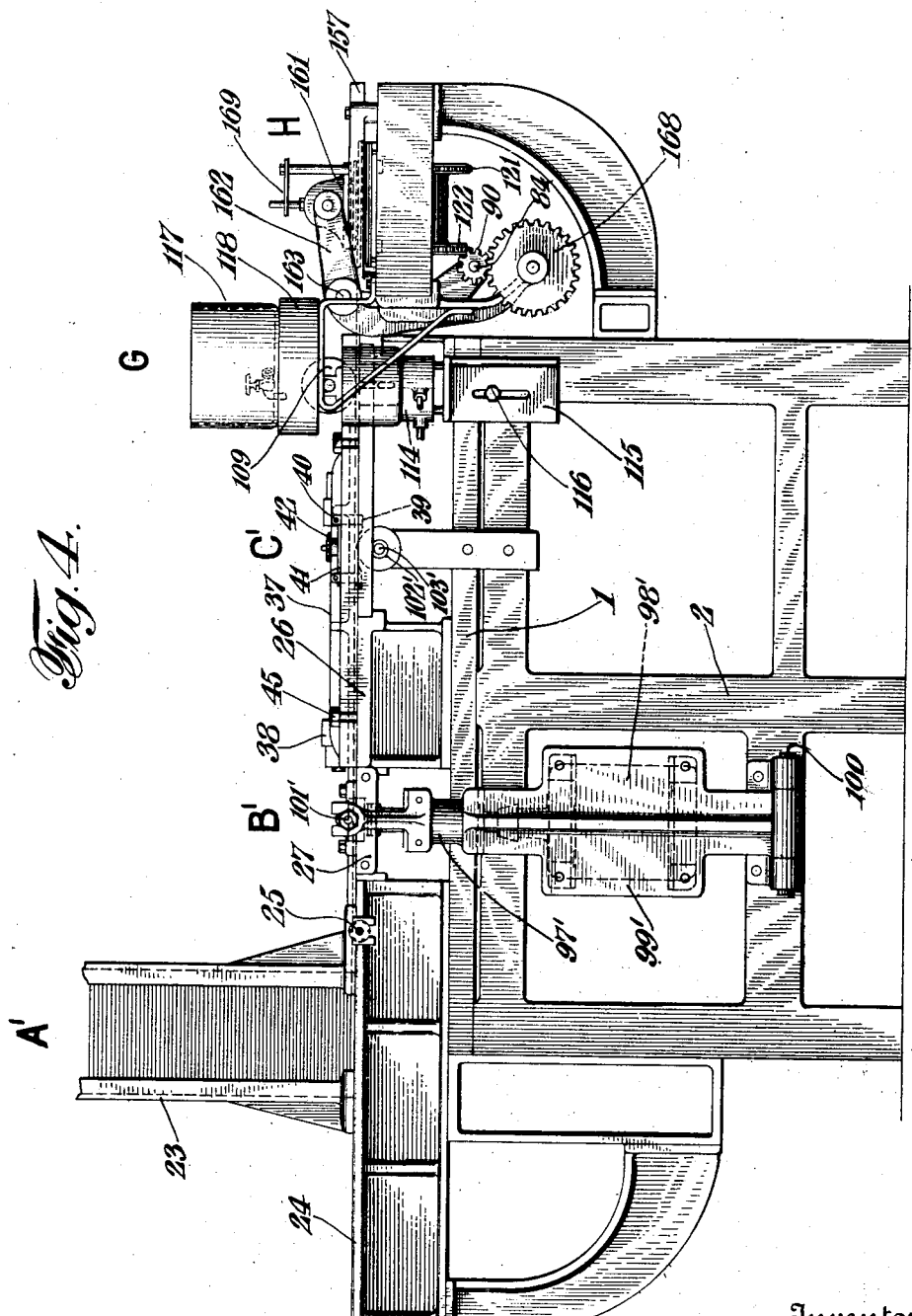

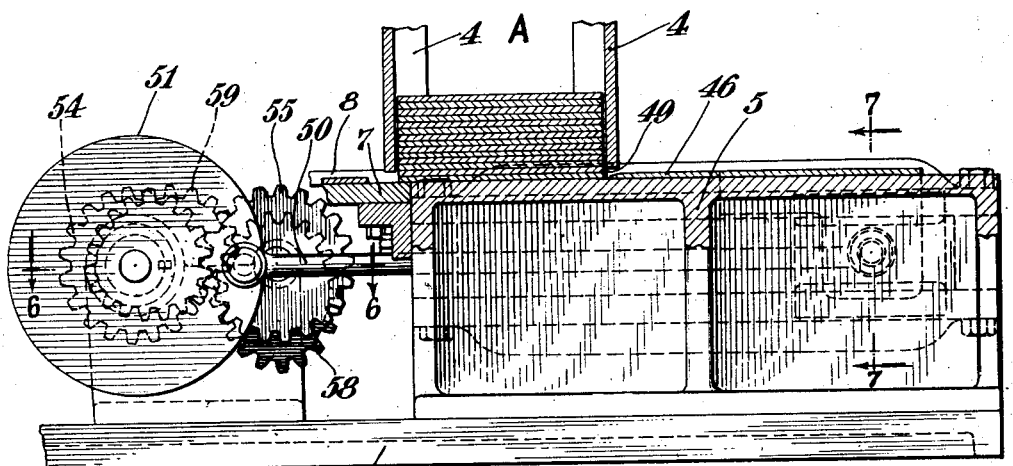
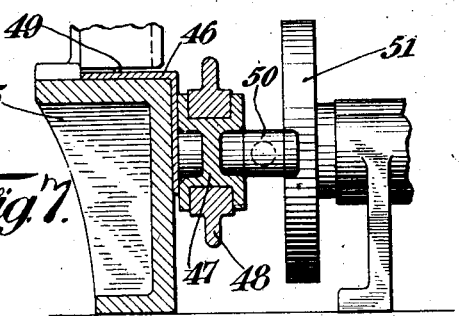
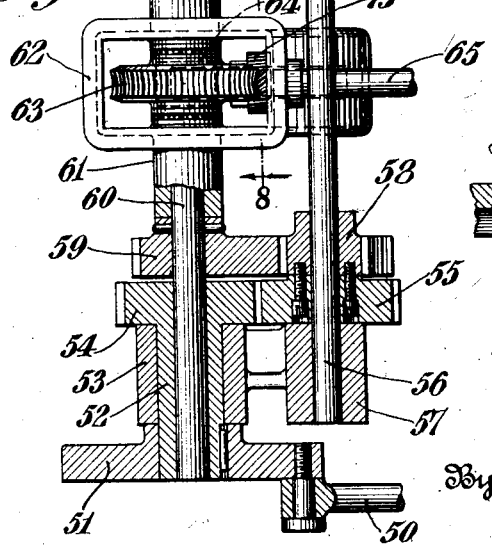
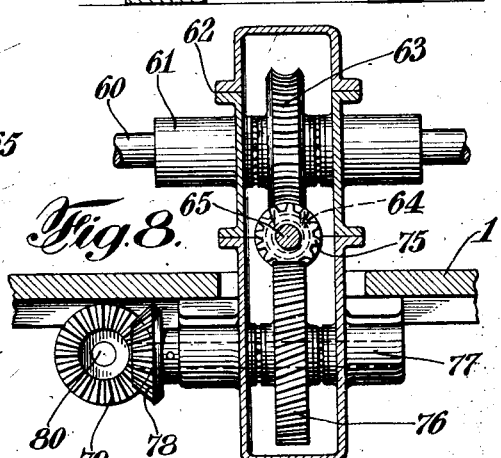

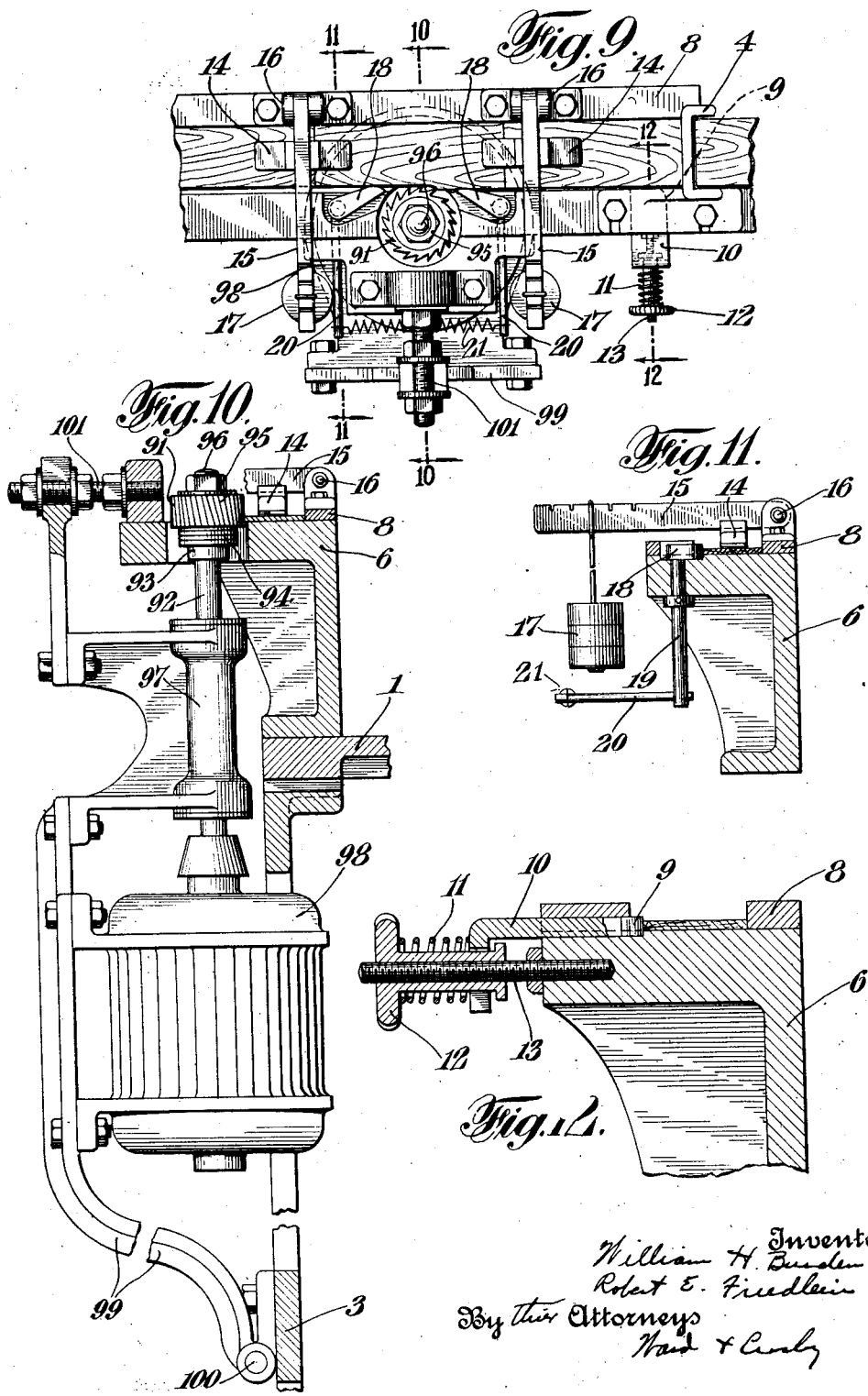

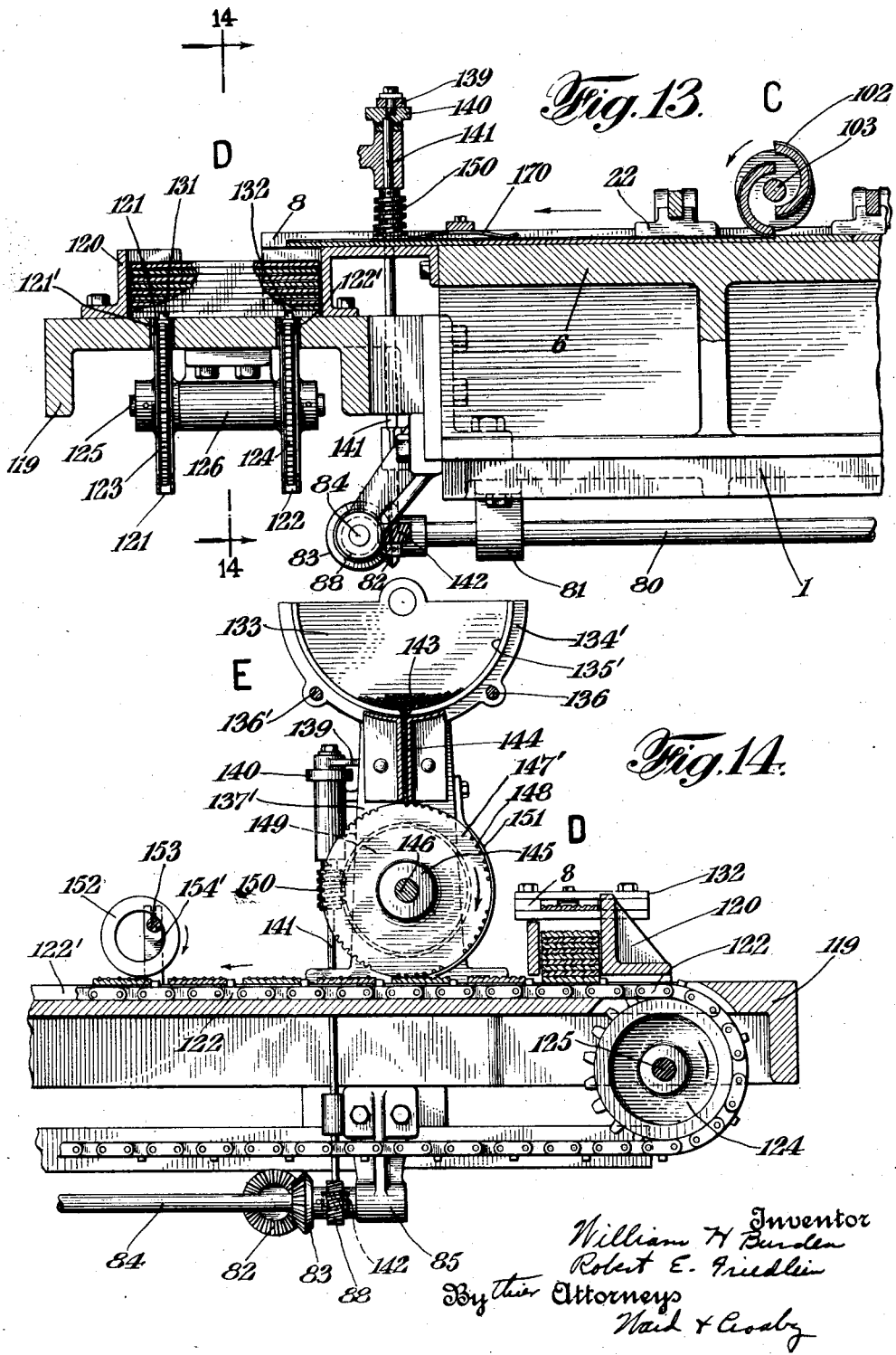

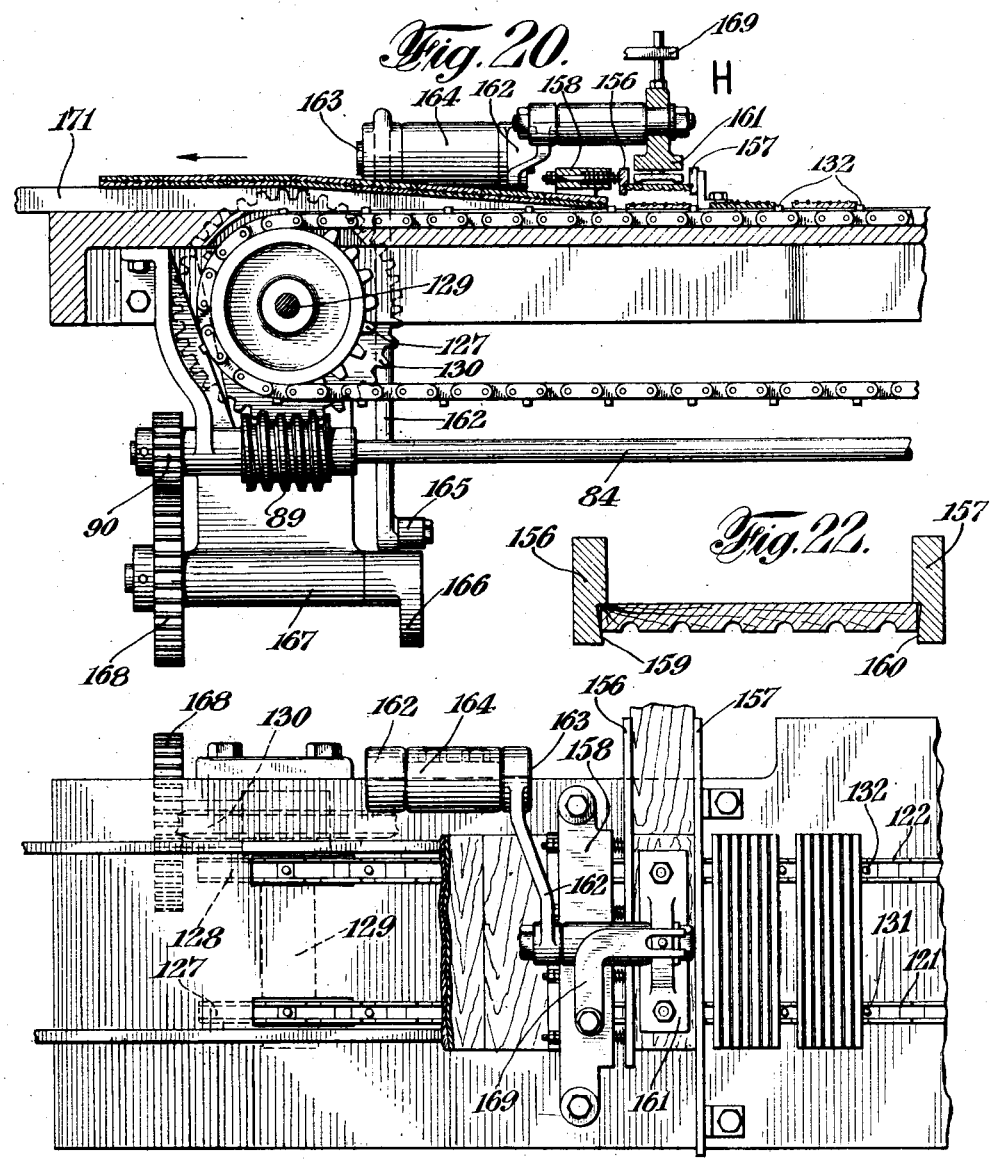

Patented Dec. 9, 1930

1,783,997

UNITED STATES PATENT OFFICE

WILLIAM H. BURDEN, OF WEEHAWKEN, AND ROBERT E. FRIEDLEIN, OF MOUNTAIN VIEW, NEW JERSEY, ASSIGNORS TO AMERICAN LEAD PENCIL COMPANY, OF NEW YORK, N. Y., A CORPORATION OF NEW YORK

APPARATUS FOR THE MANUFACTURE OF PENCILS

Application filed November 13, 1928. Serial No. 319,088.

This invention relates to improvements in the manufacture of pencils, and more particularly to apparatus for manufacturing pencil blanks from which finished pencils may afterwards be made.

In the manufacture of pencils it is the usual practice to first make blanks which comprise a wooden casing with a plurality of leads positioned therein in substantial parallel spaced relation, and to thereafter strip or cut these blocks so that individual leads are encased in the desired amount of wood or other material from which the body of the pencil is made in the finished form. According to the present accepted practice the wooden casing for the pencil blanks is formed in two halves, each of which is provided with a plurality of semi-circular grooves and the leads are placed in the grooves of one of these blanks by hand, a suitable adhesive is applied to the face of one of the blocks, and the blocks are then placed into cooperative register by hand and pressure is applied to cause the two blocks to adhere together to form what will be termed a pencil blank. After the adhesive of the pencil blank is dried sufficiently, the blank is stripped into proper size, and from each strip thus produced a finished pencil is fashioned. Heretofore the various steps in the manufacture of these pencil blanks have been performed independently and almost entirely by hand operations. More particularly the laying of the lead in the grooves of the individual blocks has caused considerable loss of time in manufacture and has resulted in a corresponding increase in production cost.

An object of this invention is to provide an efficient and durable machine capable of rapidly and automatically producing pencil blanks with great saving in expense and labor.

Before taking up a detailed description of the machine, a general description will first be given in which will be set forth the most important features in a general way, and in which certain terms to be utilized throughout the specification will be defined.

The term "lead" is to be understood as defining a marking medium formed of graphite or the like, or compositions thereof, crayons or the like, or any suitable medium for enclosure in a relatively bulky body and utilized for marking or writing. The pieces of wood or other suitable material, from which the casing for the leads are formed will be referred to as blank blocks; these blocks after they have been grooved to receive the lead will be referred to as pencil blocks; and two of these pencil blocks attached together with their grooves facing each other and in proper register and having pencil lead therein will be referred to as pencil blanks, from which blanks the final pencils are to be made. It is to be understood that the pencil blanks may include one lead or any number of leads according to the desire of the manufacturer; the present machine being adapted to form pencil blanks having six leads therein and from which, therefore, six individual pencils may be made.

The machine is adapted to operate upon two series of blank blocks, the blocks of each series being fed forward successively in the same direction and in substantially parallel relation and being substantially simultaneously successively fashioned. The fashioning of the blocks in the present machine comprises edging the blocks along at least one edge and routing the blocks to form the lead grooves therein; the blocks of one series being routed on their upper faces and the blocks of the other series being routed on their lower faces. The blocks are automatically conveyed in the same direction and a transverse conveyor is provided for successively moving blocks of one series toward blocks of the other series. Means is provided adjacent this transverse conveyor for automatically laying leads in the lead grooves of the blocks of one series, from which lead laying means the pencil blocks containing the leads are moved into successive superimposed or vertical alignment with respective blocks of the other series. Provision is made to place adhesive on the routed face of blocks of one series before they are fed into successive vertical alignment with respective blocks of the other series, one of the series of blocks having first been supplied with leads; the blocks of one series being thus successively positioned over respectively successive blocks of the other series with the grooves of respectively cooperating blocks facing toward each other and with adhesive between the blocks. After the blocks are brought into superimposed register with the adhesive between the blocks, they are caused to be brought into adhesive engagement by suitable automatic means to thereby complete the formation of the pencil blanks. The various related organisms of the machine are connected together and operated in such timed relation that the manufacture of the pencil blanks is substantially entirely automatic from the time the two series of blank blocks are fed into the machine until the finished pencil blanks are delivered from the machine; and various improved details of construction and positioning of parts have been provided, resulting in a highly efficient and economic production of pencil blanks with a minimum of labor; all of which will be better understood from the following detailed description of the preferred embodiment of the invention.

The invention consists in the novel features, arrangements and combination of parts embodied by way of example in the apparatus hereinafter described as illustrating the preferred form of the invention, and the invention will be more particularly pointed out in the appended claims.

Further objects and advantages of the invention will more fully appear from the following description taken in connection with the accompanying drawings which show by way of example the present preferred embodiment of the invention.

Referring to the accompanying drawings:

Fig. 1 is a plan view of the machine with certain parts omitted for purposes of clarity; various stations having been designated thereon as reference points for the subsequent figures, Fig. 2 is an elevation of one side of the machine, Fig. 3 is an elevation of the delivery end of the machine, Fig. 4 is an elevation of the other side of the machine, Fig. 5 is a section taken at 5—5 of Fig. 1, showing station A, Fig. 6 is a section taken at 6—6 of Fig. 5, Fig. 7 is a section taken at 7—7 of Fig. 5.

Fig. 8 is a section taken at 8—8 of Fig. 6,

Fig. 9 is a plan view of the edging mechanism and related parts at station B,

Fig. 10 is a section taken at 10—10 of Fig. 9,

Fig. 11 is a section at 11—11 of Fig. 9,

Fig. 12 is a section taken at 12—12 of Fig. 9,

Fig. 13 is a section taken at 13—13 of Fig. 1, showing further details of stations C and D, Fig. 14 is a section taken at 14—14 of Fig. 13, and shows the lead laying mechanism of station E and transverse feed of station F, Fig. 15 is a plan view showing further details of station B', Fig. 16 is a detail showing further details of station C' and G, and from which certain parts have been omitted for the purpose of clarity, Fig. 17 is a section taken at 17—17 of Fig. 16, showing further details of station C', Fig. 18 is a section taken at 18—18 of Fig. 16, and showing further details of station G, Fig. 19 is a section taken at 19—19 of Fig. 15, Fig. 20 is an illustration of certain details of construction adjacent the delivery end of the machine, comprising stations H and J, Fig. 21 is a plan view of the details shown in Fig. 20, Fig. 22 is an enlarged detail of parts of Fig. 20 at station H, and Fig. 23 illustrates a finished pencil blank.

For purposes of a ready comprehension of the mechanism, the machine will be divided up into stations identified with the capital letters of Fig. 1 and in which stations A, B and C and stations A', B' and C' designate respectively the feed stations, the edging stations and the routing or grooving stations of the two respective sides of the machine; D designating a station of rest for the blocks after they have passed stations A, B and C; station E the lead laying mechanism; station F the conveying and aligning mechanism; station G the glue or adhesive applying mechanism; station H the mechanism for attaching the blocks together; and J the discharge point of the machine. In the following description, the construction of the machine will be described in the following general order. First, the general supporting structure; then the guideways along which the two series of blocks are adapted to be respectively fed, together with the various means for holding the blocks during their fashioning; then the means for fashioning the two series of blocks, which will include also the power drive therefor; and lastly, the means for laying the lead, applying adhesive and attaching the blocks together.

Referring more particularly to Figs. 1, 2, 3 and 4; the main supporting structure for the machine comprises a substantially rigid horizontal table 1 (Figs. 1 and 4), which is supported by upright side frames (Figs. 3, 2 and 4) 2 and 3; these parts being suitably attached together to form a rigid supporting structure from which and to which the various parts of the mechanism are supported and attached.

First guideway

A suitable hopper (Figs. 2 and 5) 4 is supported from table 1 on an extension member 5, and this hopper is adapted to accommodate a plurality of blank blocks in such order that they may be successively dispensed from the bottom thereof by suitable feed means. The upper surface of the member 5 serves as the bottom of the hopper 4 and also provides a plane surface along which the blocks may be moved. A beam member 6, also supported from the table 1, has its upper surface in horizontal alignment with the upper surface of the member 5 and together with the bridging member 7 forms a plane along which the blocks may be successively fed; and a guide rail 8 (Figs. 1 and 12) is attached along the top of the member 6 and together therewith forms a track or guideway for the progressive movement of the blocks, as they are fed from station A past stations B and C to station D. Between stations A and B suitable means is provided for holding the blocks against the guide rail 8; such for example as (Fig. 12) the friction member 9 carried by the block 10 which is slidably mounted along the top of the beam 6 and is resiliently pressed forward by the adjustable compression spring 11 supported on the adjustable sleeve 12 threadedly engaging the stud 13 which is screw threaded into the beam 6. At station B, where the blocks are edged along their outer margins, the blocks are held down on their guideway by shoes (Figs. 1 and 11) 14 which are pressed downwardly by levers 15 pivotally supported at 16 to the beam 6 and carrying at their outer ends adjustable thereon weights 17. The blocks at this point are also held against the guideway 8 by arms 18 carried on spindles 19 pivotally supported on the beam 6 and carrying at their lower extremities outward extensions 20, the outer ends of which are urged together by the helical tension spring 21 to thereby resiliently press the arms 18 inwardly against the blocks and thereby urge the blocks against the guide 8.

At station C similar provision is made for holding the blocks passing that station into intimate contact with the guideway. Such holding means being similar in all respects to those described in connection with station B, they will only be designated in general at station C (Fig. 1) as 22 for holding the block down and 22a for holding the block laterally against the guide 8. The form of the holddown blocks utilized at stations B and C is shown in further detail in Fig. 13. It will therefore be seen that provision is made for guiding the blocks during their passage from station A past stations B and C and for holding the blocks in proper position at stations B and C. The series of blocks traveling along this side of the machine is adapted to be grooved or routed along the upper faces of the blocks.

*Second guideway*

Referring to Figs. 1 and 4: a second hopper 23 and supporting member 24, corresponding to the first hopper 4 and its supporting member 5, are similarly mounted and situated on the opposite side of the machine at station A'. An aligning device 25 is provided between stations A' and B' and is in all respects similar to that heretofore described and illustrated in Fig. 12; said device being adapted to hold the blocks laterally against their guideway. The guideway on this side of the machine comprises the members 24 and 26 together with the bridging member 27 which are supported from the table 1 and along the top of which the blocks are adapted to be fed past station B'. The blocks are held downwardly against their guideway by means of the shoe 28 (Figs. 15 and 19) pivotally supported at 29 from the member 24 and urged downwardly by suitable resilient means such for example as the coil spring 30 carried by the stud 31 screw threaded into the member 24. Means is provided for holding the blocks laterally against their guideway as they respectively come opposite station B' by means of the arm 32, which is pivotally supported at 33 and which is attached to an outwardly extending arm 34, to the other end of which is connected a tension spring 35 attached to a relatively rigid part of the machine as at 36, thus providing a means for holding the blocks laterally against their guideway in accordance with the practice heretofore described in connection with station B. The guideway on this side of the machine differs from that on the opposite side heretofore described commencing between stations B' and C' in the following respects. Whereas on the previous side the blocks were fed along their guideway and were held in suitable position to be grooved on their upper faces; in the present instance the blocks must be supported in such manner that they may be grooved on their lower side. To provide for such operation the portion of the guideway adjacent station C' is reversed, that is the horizontal surface along which the blocks are fed past station C' is positioned over the grooving or routing mechanism and is formed by a plate (Fig. 1) such as 37, which is hingedly supported from the beam 26 as at 38. The blocks are held from beneath against the under surface of the plate 37 (Fig. 16 and 17) by means of suitable shoes 39 which are carried by struts 40 extending upwardly through slots in the plate 37 and pivotally attached to a cross arm 41 and surrounding an adjustable sleeve 42 in threaded engagement with a stud 43 which is attached to the plate 37. Suitable adjustable resilient means, such for example as the bow leaf spring 44, is provided for urging the shoes toward the under face of the plate 37. The plate 37, as will be seen from Figs. 4, 15 and 16, extends along stations C' and G and it is releasably held in rigid position by means of the studs 45, which together with the hinged connection 38 permit the plate, which really forms an inverted support, to be removed for purposes of cleaning out the guideway or for having access to the parts normally covered by the plate 37.

*Means for feeding the blank blocks*

Since the mechanism for feeding the blocks from station A (Fig. 1) is identical in all respects to that for feeding the blocks from station A', one being substantially a duplicate of the other, only the details of the feed mechanism associated with station A will be described in detail; such details being clearly shown in Fig. 5 and sections thereof; corresponding parts of station A' bearing respectively similar numbers with the prime (') suffix added.

A reciprocable feed shoe (Figs. 5 and 7) 46 is slidably mounted on the top of the member 5 and is supported from the cross head 47 which is slidably supported in guide rails 48 supported from the member 5 (see also Fig. 1). The feed shoe 46 is free to travel in suitable slots 49 in the bottom of the hopper 4, from which the blocks are adapted to be dispensed thereby one at a time. The cross head 47 is pivotally attached to one end of a pitman 50, whose other end is pivotally attached to an eccentric 51, which is keyed to an arbor (Fig. 6) 52 supported in journal 53 and carrying at its inner end a gear 54 which is in mesh with a gear 55 loosely mounted on a shaft 56 which is supported in a part 57 formed integral with the journal 53. The gear 55 is rigidly attached to an elliptical gear 58 which is also freely mounted on shaft 56 and which is in mesh with a cooperating elliptical gear 59. The elliptical gear 59 is keyed to the shaft 60 which is suitably journaled, such as in the arbor 52, and in the bearing portion 61 of the gear housing 62 which is rigidly supported from the table 1. The shaft 61 is driven by a worm wheel 63 carried thereon and attached thereto and in driven engagement with a worm 64 carried on and attached to the end of the power shaft 65 which is supported from the table 1 by suitable means such as the journals 66 and 67 (Fig. 1). The other end of the shaft 65 carries the driven member 68 of a suitable clutch which is adapted to be driven by a cooperating driving clutch member, such as 69, which is attached to and driven by the power pulley 70. Power is delivered to the pulley 70 from any suitable source, such for example as by a power belt (not shown). The clutch member 68 is placed in driven engagement by means of the clutch arm 71 pivotally attached to a stationary part of the machine, such as at 72, and connected to a clutch rod 73 which extends substantially the length of the machine and is provided at the opposite end of the machine with a clutch handle 74.

The feeding mechanism associated with station A' is constructed and is adapted to operate in exactly the same manner as shown and hereinbefore described; it being understood that the central driving mechanism operated by the power shaft 65 is symmetrical about a plane passing through the axis of the power shaft 65 and coincident therewith. The power shaft 65 (Figs. 6 and 8) also carries secured thereon and adapted to be rotated thereby a pinion gear 75 which is in driving engagement with cooperating driven gear 76 enclosed in the lower extension of the gear box 62 and mounted on and rotating with a spindle shaft 77 journaled in a portion of the gear housing 62 positioned beneath the table 1. One end of shaft 77 extends beyond its housing and carries attached thereto and adapted to be driven thereby a bevel gear 78 which is in driving engagement with a cooperating bevel gear 79 attached to and adapted to rotate a shaft 80 (see also Fig. 13) which is supported from beneath table 1 by suitable journals such as 81. The shaft 80 carries at its outer end, adjacent station E, a bevel gear 82 in driving engagement with a cooperating bevel gear 83 attached to and adapted to rotate a transversely extending shaft 84 which is supported from the machine framework by suitable journals such as 85, 86 and 87. The shaft 84 carries in rotating engagement therewith a helical gear 88 which is adapted to operate the lead laying mechanism at station E in a manner to be more particularly described following. The opposite end of the shaft 84 (Figs. 3 and 20) carries a worm wheel 89 which is adapted to operate the transverse conveyor extending along stations E, F, H and J in a manner to be more particularly described following. The shaft 84 also carries adjacent the worm 89 a pinion gear 90 adapted to operate the mechanism at station H in a manner to be more particularly described following.

*Edging mechanism—stations B and B'*

The edging mechanisms utilized at stations B and B' being substantially duplicates one of the other, only the details of the mechanism at station B will be described in detail, reference being had more particularly to Figs. 1, 9 and 10, it being borne in mind that similar routing mechanism of station B' is shown generally in Fig. 15; and when it is necessary to refer to parts of the routing mechanism at station B', corresponding numerals will be used as employed in station B with the addition of the prime suffix. The cutter 91 for edging the blocks at station B is carried on a shaft 92 to which it is connected for rotation by any suitable means. The shaft 92 is provided with a shoulder 93 on which is positioned a plurality of individual washer plates 94 acting as spacers upon which is seated the cutter 91. The cutter 91 is held thereagainst by means of a suitable nut 95 in engagement with a threaded end 96 of the spindle 92. This means of mounting the cutter 91 permits the cutter to be easily adjusted in vertical position to thereby bring different vertical portions of its relatively broad cutting edge into operative engagement to edge the block then in position under the shoe 14, as illustrated in Fig. 10. The cutter spindle 91 is mounted in a suitable journal such as 97 and is in driven engagement with suitable motive means such as the individual electrical motor 98 which is mounted on a swinging frame 99, to which the journal 97 is also secured. The frame 99 is pivotally supported as at 100 to the side frame 3 of the machine, and the swinging frame 99 is adjustably attached to the beam 6 at its upper end for example as by the stud 101 and associated nuts and locking nuts. Provision is thereby made to adjust the cutter 91 toward and from the block to be operated upon. When the cutter 91 becomes slightly worn or dull, one of the washer plates 94 may be removed, thereby bringing a new portion of the cutting edge into cutting position.

*Grooving mechanisms—stations C and C'*

The grooving mechanism employed at stations C and C' will be described with particularity in connection with station C with reference to Figs. 1 and 13; it being understood that similar mechanism is employed in station C', which will be designated with corresponding numerals to those employed in station C, except that the prime suffix will be added; the cutters at stations C and C' being arranged respectively above and below adjacent respective guideways (Figs. 13 and 17) and this being the outstanding distinction between the two mechanisms. Referring to Figs. 1 and 13; a suitable cutter blade 102, provided with a configuration adapted to groove a plurality of substantially parallel lead grooves in the pencil blocks, is rotatably attached to a cutter spindle 103 formed as an extension of the drive shaft 104 (Fig. 1) supported in suitable journals, such as 105 and 106, mounted on the top of the table 1 and carrying at an intermediate point a power pulley 107 to which power is supplied from any suitable source, such as from a power belt. The drive of the cutter 102 is therefore also independent.

*Adhesive applying—station G*

Referring to Figs. 16 and 18: It will be noted that the plate 37, which provides on its lower side a guideway for blocks of the second series, is slotted through as at 108, and into this slot is positioned the lower periphery of a weighted roller 109 supported in vertical slots in bearings, such as 110, thereby allowing it to be urged downwardly by gravity and to come into engagement with the upper face of the blocks passing thereunder. At this point a support is provided for the under side of the blocks comprising an upwardly extending orifice member 111 of the adhesive pot 112. The orifice member 111 is provided with a slot orifice 113 through which the adhesive is adapted to be fed from the adhesive pot 112 by gravity. The orifice 113 extends less than the entire width of the guideways for the blocks and is substantially less in length than the width of the blocks. This is an important feature since it prevents the adhesive from coming into contact with the edges of the block, which is undesirable. It will therefore be seen that as the blocks are fed over the orifice member 111, the weighted roller 109 urges the blocks toward the orifice 113 and also serves to cause the excess adhesive to be scraped off the blocks as they are fed forward. The adhesive pot 112 is provided with a steam box 114 or other suitable means for maintaining the desired temperature of the adhesive; and together therewith is supported from a vertically adjustable bracket 115 attached to the frame 2 by means of an adjustable stud 116. A suitable supply reservoir 117 is preferably provided for furnishing the desired amount of adhesive to the pot 112; and the reservoir 117 is also provided with a steam box, such as 118, for maintaining the desired temperature.

*Station D and transverse conveyor mechanism*

Extending in a direction transverse the first and second guideways is a shelf 119 (Figs. 1, 2 and 13), which is supported from the main frame of the machine and whose upper surface is in a horizontal plane somewhat below the plane of the first and second guideways. On this shelf at station D is provided a bin 120, into which pencil blocks are adapted to be stacked in vertical position as they are fed forward from the first guideway. The two ends of the bin 120 are closed and are adapted to hold the blocks in substantial vertical alignment; but the inner side of the bin is provided with an opening adjacent the top of the shelf 119 of such height that one block only may be fed from the bin 120 at a time. Suitable conveyor means is provided, such as by means of the chains 121 and 122, which are mounted at one end on the sprockets 123 and 124 carried on the sprocket spindle 125 supported in the journal 126; and at their other ends (Fig. 13) by a corresponding and similar pair of sprocket wheels (Fig. 21) 127 and 128 mounted on a shaft 129 which also carries attached thereto a worm wheel 130, which is in driven engagement with the worm 89 hereinbefore referred to. The chains 121 and 122 carry pins, such as 131 and 132 respectively, and the chains are so positioned and moved that the corresponding pins 131 and 132 are directly opposite each other throughout their travel and successive pairs of such pins are spaced along the conveyor chains a distance slightly greater than the width of the pencil blocks. The chains 121 and 122 are accommodated in grooves 121' and 122' formed in the upper face of the shelf 119 with the pins projecting above the upper face of the shelf, thereby serving to successively feed the grooved pencil blocks from the bin 120 one at a time and to move them across the top of shelf 119 past stations E, F, H and J, preferably in continuous succession.

*Lead laying mechanism—station E*

The lead laying mechanism (Figs. 14, 2 and 3) is positioned just in advance of station D and is supported from shelf 119 in such position that leads may be laid in the blocks as they are conveyed forward by the transverse conveying mechanism. The lead laying mechanism comprises an upper hopper 133 which in the present embodiment is formed of two end pieces such as 134—134' (Figs. 1 and 2) having inwardly extending arcuate flanges 135—135' and being held in proper spaced relation by suitable means, such as the tie rods 136—136'. The ends 134—134' are each provided with trunnions freely journaled in uprights such as 137—137' and supported from the shelf 119; thereby permitting the hopper 133 to be oscillated about its pivotal spout. The trunnion extends through its supporting member 137' and is secured to a crank arm 138 which extends downwardly and is connected at its lower end to an eccentric link 139 which is pivotally attached to an eccentric 140 carried on the upper end of a shaft 141 which is suitably supported in journals carried by a relatively rigid part of the machine. The lower end of the shaft 141 carries secured thereto a helical gear 142 which is in driven engagement with the cooperating helical gear 88 hereinbefore referred to.

The hopper 133 is provided with a slot 143 extending axially thereof and being adapted to receive one lead at a time from the mass of leads contained in the hopper, thereby segregating leads individually from their mass and positioning the same in proper alignment to be dispensed. The hopper is further provided with an orifice 144 positioned beneath the slot 143 and extending downwardly therefrom. This orifice is provided with outwardly flanged lips in relative sliding engagement with the flanges 135—135' and is so positioned that upon oscillation of the hopper 133, the leads individually selected by the slot 143 will be arranged in the orifice 144 in tandem parallel series, in which order the leads are thereafter dispensed from the hopper. A collector drum 145 (Fig. 3) is pivotally supported on an axle 146 which is journaled in the supporting members 137—137'. The collector drum in the present embodiment is provided with (Fig. 2) two spaced circumferential flanges 147—147', and the peripheries of these flanges are positioned in close proximity to the discharge end of the orifice 144. The flanges 147—147' (Fig. 14) are each provided with a plurality of recesses 148 which are in register axially of said drum. The recesses 148 are arranged in spaced series around the periphery of the drum in group formation, each group being separated from the preceding and succeeding group by a suitable distance, and each group comprising sets of recesses equal in number to the number of grooves formed in the pencil blocks. The collector drum 145 is adapted to be rotated by a worm wheel 149 carried on the inner end of the axle 146 and in driven engagement with the worm 150 which is attached to and rotated by the shaft 141. The rotation of the drum 145 is so timed with respect to the travel of the transverse conveyor that successive recesses 148 will come into proper register with successive recesses of pencil blocks being conveyed past station E by the transverse conveyor; and successive groups of recesses 148 will come into proper register with respectively successive pencil blocks. A shield or guard 151, carried by the supports 137—137', is positioned adjacent the periphery of the drum 145 along that side traveling between the orifice 144 and the table 119, to hold the leads in proper position within their recesses 148 until they are delivered to the pencil blocks; it being understood that the drum 145 is spaced in such position that the periphery thereof will be substantially tangent to the top of the pencil blocks being fed thereunder.

During the travel of the blocks past the collector drum 145 it sometimes happens that for one reason or another the leads are not properly seated in their grooves and in order to insure that the leads will be so seated before the cooperating blocks are attached thereon to encase the leads, a lead aligning means is provided in advance of the drum 145. This device comprises a ring 152 preferably in the form of a section of a cylinder and made of material of a suitable weight. The ring is mounted on a pin 153 supported in vertical slots formed in uprights 154—154' extending upwardly from the shelf 119 and supported thereby. The vertical distance of the pin 153 above the shelf 119 is such that it is somewhat below the position at which it would support the ring 152 free from engagement with the leads in the blocks being fed therepast. As will be seen from Fig. 14, the ring is partly supported by the leads and the pin 153 prevents the ring from too great a horizontal movement and acts as a pivot point about which the inner circumference of the ring might slide.

*Station F*

During the travel of the pencil blocks from station E to H, it is desirable to accurately align them crosswise of the transverse conveyor, as for example at station F. In order to provide for such alignment guide rails (Fig. 1) 155 and 155' are provided.

*Attaching blocks together—station H*

The mechanism at this station provides for supporting successive blocks of the second series in such position that respectively cooperating successive blocks bearing the leads and carried by the transverse conveyor may be moved thereunder and brought into cooperative vertical register therewith. Accordingly, the guideway for the second series of blocks is extended by means of two guide rails (Figs. 21 and 22) 156 and 157. The guide rail 157 is rigidly supported from the shelf 119, and the guide rail 156 is supported from a block 158 carried by shelf 119, in such manner that it is restricted in vertical movement but is yieldably resiliently held toward the rail 157. The rails 156 and 157 are provided with respective notches 159 and 160 which serve to normally support the blocks of the second series in proper alignment. Due to the resilient means for holding the block 156 toward the block 157, however, the pencil block may be displaced from the grooves 159—160 by exerting suitable pressure on the upper side of the block.

The means for displacing the block from the grooves 159—160 comprises a presser head 161 which is supported on a bell crank 162 pivoted at 163 (Fig. 3) in journal block 164. The lower end of the bell crank 162 is provided with a cam stud 165 which is in operative position to be engaged by a knife point cam 166 attached to one end of the shaft supported in the journal 167 and carries at its other end a gear 168 which is in driven engagement with the cooperating gear 90 hereinbefore described. The head 161 is guided by suitable means, such as 169 in such manner that its lower face will be held in a horizontal plane parallel to the upper face of the block which it is to displace. The construction and operation of this presser mechanism is such that it will be operated in timed relation with the movement of the blocks by the transverse conveyor; thereby resulting in pressing cooperative blocks together in proper register.

It will be understood that for purposes of brevity and clarity only general reference has been made hereinbefore to the timing of the various mechanisms described above in more or less independent units, although, as will be obvious to those skilled in the art after an understanding of the invention, the various organisms and parts hereinbefore described are so corelated and interconnected that the machine operating as a unit has all of its moving parts timed in proper relation and sequence to perform the desired functions thereof. This timing and the various sequences of operations will be clearly understood from the description following, under which the operation of the machine will be set forth in detail.

*Operation*

The blank blocks of material, such for example, as wood, cut to the desired thickness and length and approximately to the width desired, are delivered to the machine in the hoppers A and A'. The control handle 74 is then pushed to connect the power shaft 65 to the power pulley 70. This simultaneously starts the operation of the feeding mechanisms of stations A and A', the lead laying mechanism at station E, the transverse conveyor mechanism adjacent station F, and the presser mechanism at station H. The individual power drives operating the mechanism at stations B, B', C and C' are also in operation at this time; and suitable adhesive has been placed in the pot 112 and has been brought to the proper temperature by the steam chest 114 (Fig. 18).

First the feed and fashioning of the first series of blocks will be described in connection with stations A, B, C and D, then the feed and fashioning of the second series of blocks will be described, then the transverse feed of the first series of blocks will be described in connection with the lead laying and attaching together of the respectively cooperating blocks of the two series.

The blank blocks from hopper A are fed forward one at a time by the feed shoe 46 in continuous end to end series, the blocks being moved along their guideway intermittently, pursuant to successive reciprocations of the feed shoe 46, being held thereagainst by the means hereinbefore described. As the blocks pass station B, they are edged by the cutter 91, at the same time being held in seated engagement with their guideway by the arms 18 and shoes 14. Upon the further feed reciprocations of the shoe 46, the block thus edged is passed along to station C where it is grooved by the cutter 102. Upon further intermittent movement of the series, the block passes under the bow spring friction member 170 which furnishes the necessary friction for holding the blocks in positive end to end abutment ahead of the reciprocating feed shoe 46. As the blocks successively pass under the spring 170 (Fig. 2) they are caused to fall into bin 120, where they are stacked in vertical alignment, and from the bottom of which they are adapted to be moved by the transverse conveyor chains 121 and 122. The blocks are successively fed from the bottom of the bin 120 (Figs. 3 and 14) by being engaged with the corresponding pairs of pins 131 and 132 and are moved to the lead laying means at station E. As the blocks are fed under the drum 145, the leads which have been dispensed from the hopper 133 and which have been collected on the drum in proper group series are deposited in spaced group series on the face of the blocks and in substantial register with the grooves formed therein. The pencil blocks containing the leads are moved beneath the aligning ring 152 which assures the proper seating of the leads in their respective grooves; after which the blocks containing the leads so positioned are moved on toward the second series of blocks, the formation and feed of which will now be described, with reference to Figs. 1 and 4.

From the hopper 23 at station A' the blocks are fed forward in the manner above described and are similarly edged and grooved, it being particularly noted, however, that the grooves on this series of blocks are formed on the lower face of the blocks, in accordance with the principle hereinbefore set forth. After the blocks have thus been edged and grooved, at stations B' and C' respectively, they are moved past station G (Figs. 16 and 18), where the lower faces of the blocks are moved across the orifice 113, at which time the adhesive from pot 112 is flowed on to the lower faces of the blocks carrying the grooves, and excess adhesive is caused to be wiped off due to the pressure exerted on the block by the weighted roller 109. From station G the blocks are fed between the guide rails 156 and 157 (Figs. 20–22). At the time when a block reaches the position along the rails 156—157 where it is in substantial register with the corresponding block of the other series which has now moved into position under it, the presser head 161 rapidly moves downwardly, forcing the block from the grooves 159—160 on to the corresponding block positioned at that time in direct register therewith; the two corresponding blocks being thereby forced into adhesive engagement with the leads positioned in proper alignment therebetween to thereby form the finished pencil blank. The pencil blanks thus formed are conveyed up the slight incline rails 171 (Fig. 20) to clear them of the sprockets 127—128, and are ejected or taken from the machine at station J.

Afterwards the pencil blanks thus formed are treated in a manner well known to those skilled in the art; a detailed description of which is not deemed necessary, but a general description of which will be referred to hereinafter for purposes of ready reference. The pencil blanks (Fig. 23) thus produced by the machine are stacked in a suitable press with their flat faces together and pressure is applied to squeeze out any excess adhesive that may remain. The blanks are then allowed to dry, preferably still in suitable clamps or press frames, and are thereafter divided into individual pencil blanks and the finished pencils are produced, all of which will be well understood by those skilled in the art. As has been heretofore explained, the pencil blanks produced according to the present invention may comprise any desired number of leads, and according to the number of leads contained therein will produce a corresponding number of pencils.

Having thus described our invention with particularity with reference to the preferred embodiment of the same, and having referred to some of the possible modifications thereof, it will be obvious to those skilled in the art, after understanding our invention, that other changes and modifications may be made therein without departing from the spirit and scope of our invention, and we aim in the appended claims to cover such changes and modifications as are within the scope of the invention.

What we claim is:

1. In a machine of the character described the combination of, means for feeding a first pencil block having a groove therein, means operable in synchronism with said block feed and in a direction of movement transverse said groove for delivering a lead into said groove while said block is moving, means for moving a second block having a groove therein and for applying adhesive on the grooved face thereof, and means for relatively moving said blocks into adhesive registering engagement, to thereby form a pencil blank.

2. In a machine of the character described the combination of, means for feeding a pencil block having a groove therein, means for delivering a lead into said groove, and means for moving said delivery means in synchronism with said block as the latter moves and in a direction of movement transverse said groove.

3. In a machine of the character described the combination of, means for feeding a pencil block having a groove therein, means for delivering a lead into said groove, means for moving said delivery means in synchronism with said block as the latter moves and in a direction of movement transverse said groove, and means for accurately aligning said lead in said groove.

4. In a machine of the character described the combination of, means for feeding a pencil block having a plurality of parallel grooves therein, means for delivering a plurality of leads in parallel series into said grooves, and means for moving said delivery means in synchronism with said block as the latter moves and in a direction of movement transverse said grooves.

5. In a machine of the character described the combination of, means for feeding a pencil block having a plurality of parallel grooves therein, means for delivering a plurality of leads in parallel series into said grooves, means for moving said delivery means in synchronism with said block as the latter moves and in a direction of movement transverse said grooves, and means for accurately aligning said lead in said grooves.

6. In a machine of the character described the combination of, means for feeding a pencil block having a groove therein, means for delivering a lead into said groove, means for moving said delivery means in synchronism with said block and in a direction of movement transverse said groove, and means actuated by the movement of said block and said lead carried thereby for accurately aligning said lead in said groove.

7. In a machine of the character described the combination of, a hopper for dispensing leads, a rotatable lead collector for receiving leads dispensed from said hopper in continuous spaced group formation wherein each group comprises a plurality of leads, means for rotating said collector to bring successive group series to a delivery point at predetermined time intervals, and means to successively deliver individual leads of each series in predetermined alignment.

8. In a machine of the character described comprising means for laying leads in grooved pencil blocks the combination of, a hopper for dispensing leads in successive tandem parallel series, a rotatable drum provided with a plurality of parallel peripheral recesses for receiving successive leads from said hopper, means for holding said leads in their respective recesses during the rotation of said drum, and means for intermittently rotating said drum in predetermined timed relation to the feed of pencil blocks therepast to thereby lay said leads on the grooved face of the blocks in a predetermined order.

9. In a machine of the character described comprising means for laying leads in grooved pencil blocks the combination of, a hopper for dispensing leads and comprising an agitator for selecting individual leads and an elongated downwardly extending orifice to receive said individual leads and to deliver them in successive tandem parallel series, a rotatable drum provided with a plurality of parallel peripheral recesses for receiving successive leads from said orifice, means for holding said leads in their respective recesses during the rotation of said drum, and means for intermittently rotating said drum in timed relation to the feed of pencil blocks thereto to thereby lay said leads on the grooved face of the blocks in a predetermined order.

10. In a machine of the character described the combination of, means for conveying successive pencil blocks each having a series of lead grooves formed therein to a lead laying means, and means for successively laying leads in said blocks, said laying means comprising a hopper for holding and dispensing leads, lead collecting means having a plurality of series of recesses, each series being adapted to receive leads corresponding in number to the grooves in each of said blocks, and means for moving said collector past said hopper to receive leads in group series and lay the same in said blocks as they are successively conveyed thereto by said conveyor means.

11. In a machine of the character described the combination of, means for conveying successive pencil blocks each having a plurality of lead grooves formed therein to a lead laying means, and a lead laying means in the path of travel of said blocks and comprising a hopper for holding leads to be dispensed and having an outlet orifice, a rotatable collector having peripheral recesses arranged in spaced groups with each group comprising a series of said recesses, said recesses being adapted to be moved successively into register with said orifice to receive leads therefrom in group formation and being adapted to move progressively adjacent said respective blocks, and means for rotating said collector in timed relation with the movement of said pencil blocks to successively deliver said groups of leads onto the grooved faces of respective blocks.

12. In a machine of the character described the combination of, means for conveying successive pencil blocks each having a plurality of lead grooves formed therein to a lead laying means, a lead laying means in the path of travel of said blocks and comprising a hopper for holding leads to be dispensed and having an outlet orifice, a rotatable collector having peripheral recesses arranged in spaced groups with each group comprising a series of said recesses, said recesses being adapted to be moved successively into register with said orifice to receive leads therefrom in group formation and being adapted to move progressively adjacent said respective blocks, and means for rotating said collector in timed relation with the movement of said pencil blocks to successively deliver said groups of leads onto the grooved faces of respective blocks, and means positioned beyond said laying means for accurately aligning said leads in said pencil block grooves.

13. In a machine of the character described the combination of, a first guideway along which a first series of blank blocks are adapted to be moved and fashioned into a first series of pencil blocks, a second guideway along which a second series of blank blocks are adapted to be moved and fashioned into a second series of pencil blocks, first means cooperatively associated with said first guideway for fashioning said first series of pencil blocks, second means cooperatively associated with said second guideway for fashioning said second series of pencil blocks, first conveyor means for conveying said first series of blocks along said guideway and past said first fashioning means, second conveyor means for conveying said second series of blocks along said guideway and past said second fashioning means, third conveyor means extending in a direction transverse said first and second conveyor means for successively moving pencil blocks of said second series into register with respectively cooperating pencil blocks of said first series, lead laying means cooperatively positioned with respect to said third conveyor means for laying leads in pencil blocks of said second series during their travel from said second conveyor means toward said first series of pencil blocks, means for applying adhesive on the faces of pencil blocks of one of said series, and means operating in timed relation with said third conveyor means for relatively moving respective blocks of said first and second series into adhesive engagement.

14. In a machine of the character described the combination of, a first guideway along which a first series of blank blocks are adapted to be moved and progressively fashioned into a first series of pencil blocks, a second guideway along which a second series of blank blocks are adapted to be moved and progressively fashioned into a second series of pencil blocks, first means cooperatively associated with said first guideway for progressively fashioning said first series of pencil blocks, second means cooperatively associated with said second guideway for progressively fashioning said second series of pencil blocks, first conveyor means for progressively conveying said first series of blocks along said guideway and past said first fashioning means, second conveyor means for progressively conveying said second series of blocks along said guideway and past said second fashioning means, third conveyor means extending in a direction transverse said first and second conveyor means for successively moving pencil blocks of said second series into register with respectively cooperating pencil blocks of said first series, lead laying means cooperatively positioned with respect to said third conveyor means for laying leads in pencil blocks of said second series during their travel from said second conveyor means toward said first series of pencil blocks, means for applying adhesive on the faces of pencil blocks of one of said series, and means operating in timed relation with said third conveyor means for relatively moving respective blocks of said first and second series into adhesive engagement.

15. In a machine of the character described the combination of, a first guideway along which a first series of blank blocks are adapted to be moved and progressively fashioned into a first series of pencil blocks, a second guideway along which a second series of blank blocks are adapted to be moved and progressively fashioned into a second series of pencil blocks, first hopper means for holding and individually dispensing said blocks to said first guideway, second hopper means for holding and individually dispensing said blocks to said second guideway, first means cooperatively associated with said first guideway for fashioning said first series of pencil blocks, second means cooperatively associated with said second guideway for fashioning said second series of pencil blocks, first conveyor means for conveying said first series of blocks along said guideway and past said first fashioning means, second conveyor means for conveying said second series of blocks along said guideway and past said second fashioning means, third conveyor means extending in a direction transverse said first and second conveyor means for successively moving blocks of said second series into register with respectively cooperating blocks of said first series, lead laying means cooperatively positioned with respect to said third conveyor means for laying leads in pencil blocks of said second series during their travel from said second conveyor means toward said first series of blocks, means for applying adhesive on the faces of blocks of one of said series, and means operating in timed relation with said third conveyor means for relatively moving respective blocks of said first and second series into adhesive engagement.

16. In a machine of the character described the combination of, a first guideway along which a first series of blank blocks are adapted to be moved, a second guideway along which a second series of blank blocks are adapted to be moved, first means cooperatively associated with said first guideway for forming lead grooves on the under side of said first series of pencil blocks, second means cooperatively associated with said second guideway for forming lead grooves on the top side of said second series of pencil blocks, conveyor means extending in a direction transverse said first and second guideways for successively moving blocks of said second series into register with respectively cooperating blocks of said first series, lead laying means cooperatively positioned with respect to said conveyor means for laying leads in pencil blocks of said second series, means for applying adhesive on the faces of blocks of one of said series, and means operating in timed relation with said conveyor means for relatively moving respective blocks of said first and second series into adhesive engagement.

In testimony whereof we have signed our names to this specification.

WILLIAM H. BURDEN.
ROBERT E. FRIEDLEIN.